US 6,717,947 B1

(12) United States Patent
Ghodrat et al.

(10) Patent No.: US 6,717,947 B1
(45) Date of Patent: Apr. 6, 2004

(54) METHOD AND APPARATUS FOR ISOCHRONOUS DATA TRANSFER WITH RETRY CAPABILITY

(75) Inventors: Fataneh F. Ghodrat, Fort Collins, CO (US); Michael R. Stein, Fort Collins, CO (US); David A. Thomas, Fort Collins, CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/204,766

(22) Filed: Dec. 3, 1998

(51) Int. Cl.[7] .............................................. H04L 12/56
(52) U.S. Cl. ................................................... 370/395.1
(58) Field of Search .................................. 370/401, 402, 370/403, 384, 351, 352, 395, 450, 444, 443, 449, 216, 225, 227, 228, 229, 217, 219, 230, 231, 232, 233, 234, 395.1, 465, 468; 340/825.5, 825.03, 825.51, 825.52

(56) References Cited

U.S. PATENT DOCUMENTS

| | | | |
|---|---|---|---|
| 5,493,570 A | 2/1996 | Hillman et al. | 370/105.3 |
| 5,495,481 A | 2/1996 | Duckwall | 370/85.2 |
| 5,504,757 A | 4/1996 | Cook et al. | 370/84 |
| 5,619,646 A | 4/1997 | Hoch et al. | 395/200.01 |
| 5,631,906 A * | 5/1997 | Liu | 370/455 |
| 5,764,930 A | 6/1998 | Staats | 395/287 |
| 5,822,524 A * | 10/1998 | Chen et al. | 709/203 |
| 5,953,350 A * | 9/1999 | Higgins | 370/254 |
| 6,041,051 A * | 3/2000 | Doshi et al. | 370/474 |
| 6,075,787 A * | 6/2000 | Bobeck et al. | 370/470 |

OTHER PUBLICATIONS

Isochronous Traffic on SCSI; http://www1.cern.ch/RD24/TwoPages/Twopages_16.html1; pp. 1–3.

* cited by examiner

*Primary Examiner*—Dang Ton
(74) *Attorney, Agent, or Firm*—Carstens, Yee & Cahoon, LLP

(57) ABSTRACT

Isochronous data transfers guarantee data packets are received at a particular frequency and within a prespecified jitter-tolerance. Asynchronous data transfers guarantee data integrity by allowing missed or errant packets to be resent as many times as needed until an error-free packet may be reconstructed at the receiver. Isochronous transfers address real-time needs but do not address the data integrity issue. Asynchronous transfers address the data integrity issue but cannot guarantee error-free data packets will be available so as to meet a real-time constraint. The present invention provides method and apparatus enable isochronous data transfers with improved data integrity. Various link layer and transaction layer mechanisms are taught. An embodiment involving the IEEE 1394 bus specification is addressed in detail.

24 Claims, 3 Drawing Sheets

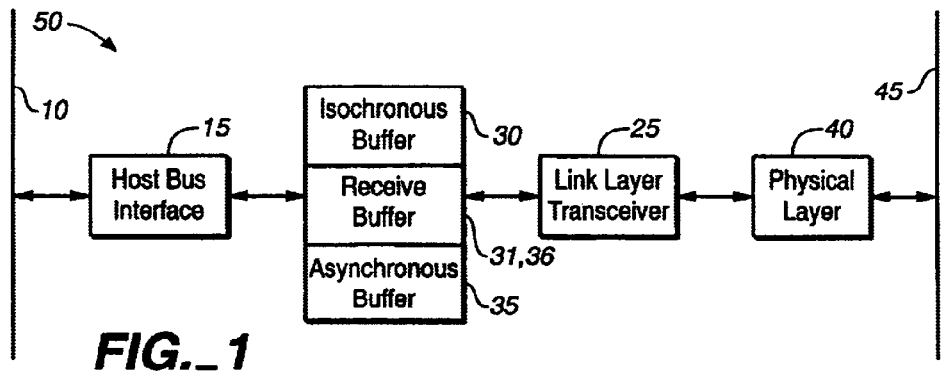
FIG._1
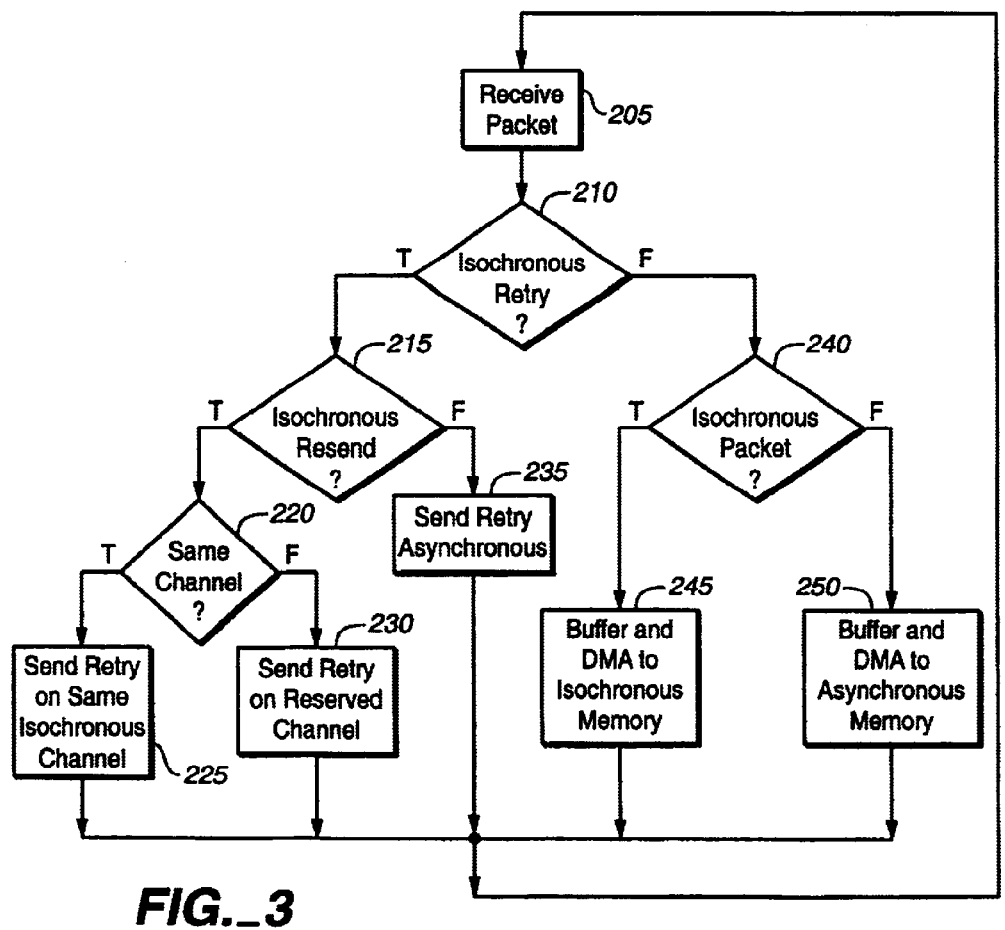
FIG._3

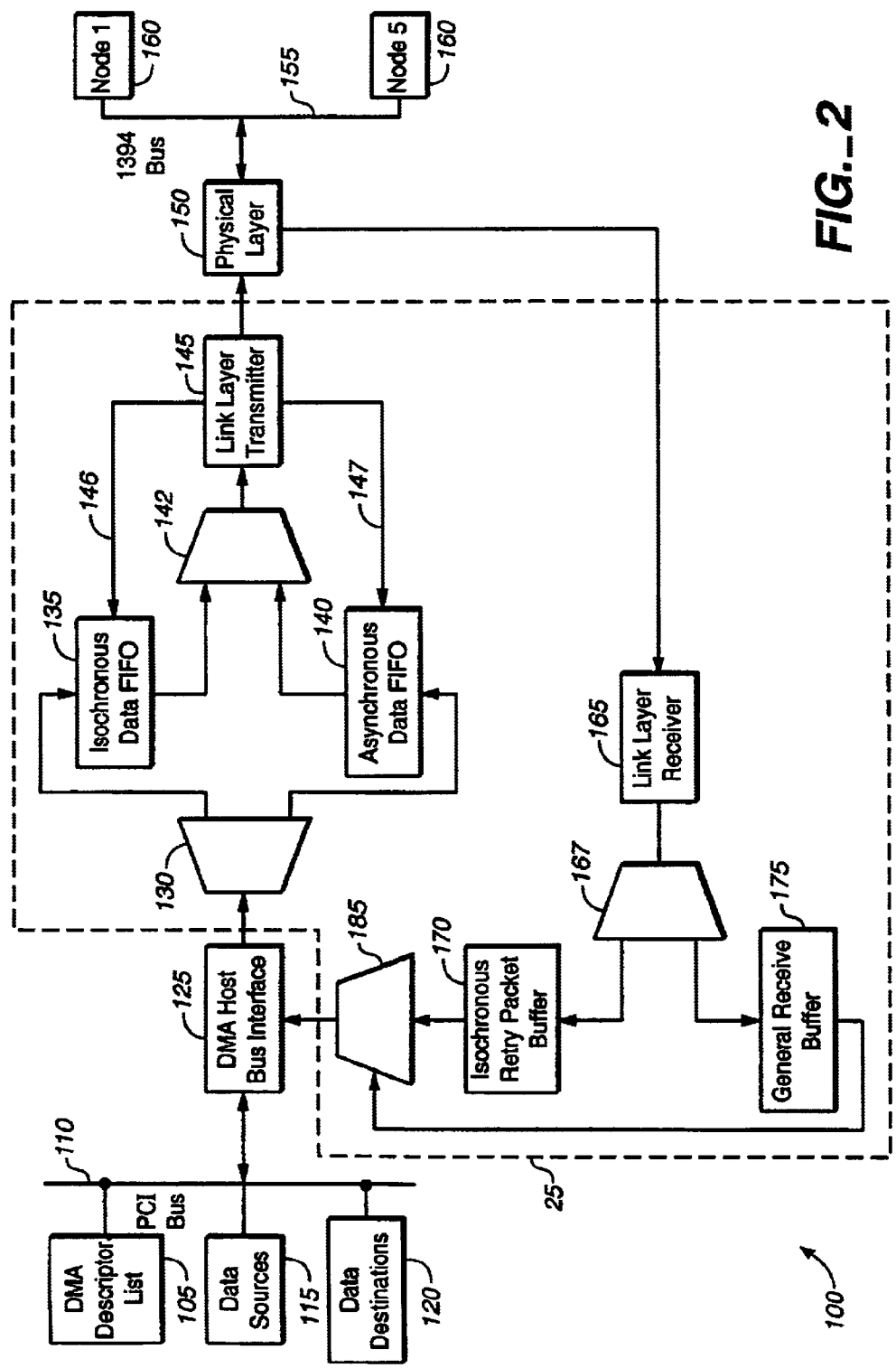
FIG._2

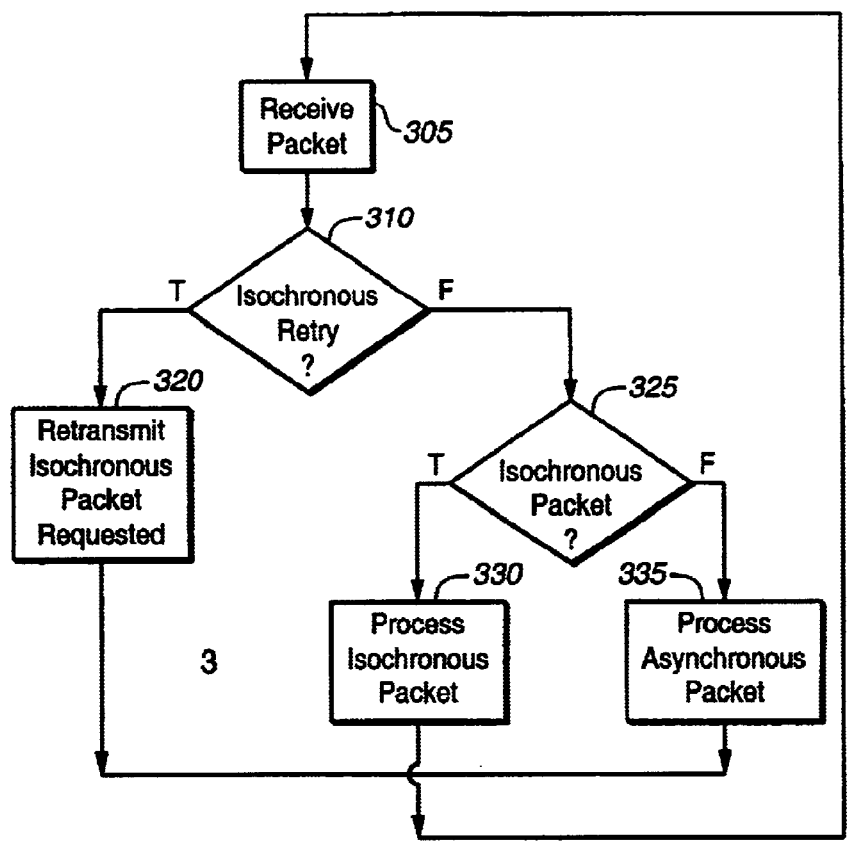
FIG._4
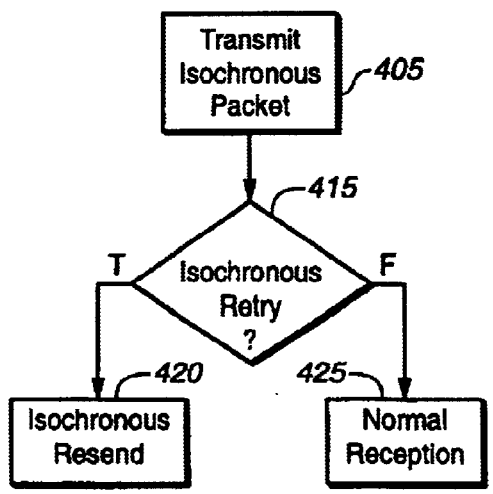
FIG._5

METHOD AND APPARATUS FOR ISOCHRONOUS DATA TRANSFER WITH RETRY CAPABILITY

BACKGROUND OF THE INVENTION

1. Technical Field

This invention relates the transport of data packets through a network such as a serial bus or a packet switched network. More particularly, the invention relates to mechanisms which allow isochronous packets to be delivered with improved accuracy.

2. Description of the Related Art

Communication systems are often classified as employing time division multiplexing (TDM) or statistical multiplexing (SM). TDM systems assign to a transmitter one or more periodically available timeslots. The transmitter is then allowed to transmit information bits into a communication medium during its assigned timeslots. TDM systems allocate bandwidth to a given transmission channel and thereby guarantee a time of delivery for information transmitted thereon. SM systems involve transmitters which transmit data packets into a network. The data packets are passed along a set of communication links on a best-efforts basis. Depending on the protocol used, packets often may not arrive within a prespecified time. However, SM systems allow bandwidth to be more efficiently used because transmitters which are not transmitting useful data do not consume bandwidth.

TDM systems have some distinct advantages and disadvantages when compared with SM systems. TDM systems are inherently useful when a quality of service (QOS) is required. QOS refers to a communication system's ability to guarantee a specified transmission bandwidth, and time-of-arrival of data packets. In some cases QOS also involves using channels which provide a specified bit-error rate. For example, in a video conferencing system using leased lines, enough bandwidth is allocated to guarantee video and audio data will pass through the connection at all times with a specified level of quality. However, TDM systems are inherently inefficient when data transfer rates are considered from a network perspective. Instead of using network bandwidth only when useful data needs to be sent, the TDM transmitter occupies network bandwidth continuously.

Communication systems often involve data channels which transfer data packets using an "acknowledged protocol." An example of an acknowledged protocol is the transport control protocol (TCP) as used in the Internet. An acknowledged protocol is designed to provide reliable point-to-point data transfer and thereby provides methods to retransmit data packets found to be in error. Error control codes such as CRC codes are often sent to allow a receiver to determine whether a received data packet contains errors. If the data packet does contain errors, a retry-request packet is forwarded back to the transmitter so the errant packet may be resent. An example of a non-acknowledged protocol is the user datagram protocol (UDP) as also used in the Internet. When a UDP packet is sent, no acknowledge is required. Rather UDP packets can be flooded across a network to one or more destinations using broadcast or multicast methods. A broadcast involves sending one or more packets to all nodes on the network. A multicast involves sending one or more packets to more than one node on the network, but not necessarily all of the nodes. When compared to TCP, UDP packet streams also consume less bandwidth because no acknowledge packets and no resent packets are associated with the UDP packet stream. Also, for certain data types such as real-time multimedia viewers and players, a late packet needs to be discarded just like an erroneous packet. Hence network bandwidth is conserved by not re-transmitting data which will only be later discarded at the receiving end. Also, UDP packets enable broadcast and multicast data transfer methods. The cost of using a non-acknowledged protocol such as UDP is the loss in reliability of data.

UDP datagrams are often used within protocols designed to provide data transmissions having guaranteed bandwidth and on-time delivery. The resource reservation protocol (RSVP) is one example. RSVP is a protocol employed by network routers to establish a path with guaranteed bandwidth and packet delivery times. RSVP and similar protocols are needed to insure multimedia data streams involving real-time voice and video data can be played by a media player at a receiving end of a connection with a specified QOS.

Variants of aforementioned modes of data transfer are also used in communications involving locally connected computers and peripherals. For example, the Institute of Electrical and Electronic Engineers (IEEE) 1394 specification entitled "High Performance Serial Bus" defines a communication system used to transfer data between locally connected equipment. For example, the equipment may include computers, digital video players, digital audio players, camcorders, remote control devices, and related equipment including computer mouse and keyboard interfaces. A system compliant with the IEEE 1394 specification will be referred to hereinafter as a "1394 system." A given 1394 system involves a collection of nodes connected in a tree topology without any loops. Both computer backplane and cable based topologies are supported and can be mixed in a given system configuration. A full set of details regarding supported network topologies and configurations are documented in the IEEE 1394 specification.

The 1394 system includes two main types of bus accesses, namely "isochronous" and "asynchronous." In the context of the 1394 specification, a "bus access" involves a data transfer. These two main types of bus accesses address different sets of needs experienced in locally connected computer system arrangements involving computer devices as well as multimedia devices. Isochronous transfers use a non-acknowledged protocol similar to UDP, and provide a guaranteed bandwidth and latency much like RSVP. Isochronous transfers are broadcast to all nodes in the 1394 system. These nodes pass the information stream on to one or more neighboring nodes. One or more selected nodes may be programmed to accept and process the isochronous transmission.

By definition, on an "isochronous" channel, a determined maximum bandwidth may be transmitted periodically within a repeating time interval. Isochronous channels guarantee a packet stream will be provided with enough bandwidth to meet that packet stream's needs, and that all packets will arrive at all receiving nodes within a specified jitter tolerance. By definition, an "asynchronous" bus access is one where packets or groups of packets are transmitted to a receiver, and an acknowledge packet is then sent back from the receiver to the transmitter. In an asynchronous protocol, when a receiver detects an errant packet, it transmits an error acknowledge back to the transmitter. The transmitter then resends the packet. In the 1394 system, asynchronous packets are sent using a best efforts access strategy whereby competing nodes arbitrate to gain access to the 1394 bus. Hence while asynchronous bus access have a guaranteed reliability, they do not provide a guaranteed bandwidth or delivery time. Also, unlike isochronous data streams which are broadcast to all nodes, asynchronous transfers involve point-to-point communications.

Isochronous bus accesses support data transfers which require guaranteed bandwidth and latency. This is equivalent to assuring a QOS in a communication network. Like TDM channels, isochronous transfers are assigned a channel which corresponds to a periodically available timeslot of specified duration. Unlike TDM systems, the beginning point of this timeslot within an isochronous cycle is not prespecified, only the fact that the timeslot will be available within the cycle is assured. In the 1394 specification, an isochronous cycle time is set at 125 us. As much as 80% of this isochronous cycle time may be assigned to isochronous bus accesses. The remaining 20% is dedicated to support asynchronous transfers as are described herein below. Timeslots are assigned in "bandwidth allocation units." A bandwidth allocation unit corresponds to a 20 ns timeslot of which there are 6144 in a 125 us interval. Timeslots are allocated and managed by an isochronous resource manager. Once a channel has been established, an isochronous transmitting device is guaranteed to have the requested amount of time for that cycle. Only one device may transmit on a given channel, but all other devices connected into a 1394 system may receive data on the channel. A single device may be assigned multiple channels which it may transmit data thereon.

Asynchronous transactions provide an acknowledged datagram transfer for point-to-point interactions. Asynchronous transfers can take place any time the bus is not involved in an isochronous transfer or other bus management functions such as bus reset. In fact, a minimum of 20% of the bus bandwidth is made available to support asynchronous transfers. A short acknowledge packet is returned to the sending node in response to each received packet to indicate whether or not each packet was errant. The sending node can retransmit a given packet as many times as specified by software if the sending node receives a busy or error acknowledge from the receiving node. All nodes arbitrate the bus with equal priorities in order to gain access of the bus to perform an asynchronous transfer. Only a root node which is the system master node has a priority higher than all the other nodes. Hence the root node can gain access to the asynchronous transfer portion of the bus faster than any other node. The acknowledged datagram service of the 1394 specification is used for point-to-point transactions where errors are largely intolerable. For example, when a program is loaded from a disk into a memory, a single bit error could result in a complete system failure when the erroneous program is executed.

The foregoing discussion is indicative of the fact that different types of data transfers involve different requirements. For example, Internet based systems employ acknowledged TCP packets, unacknowledged UDP datagrams, and RSVP protocols to address these differing needs. The IEEE 1394 specification employs isochronous and asynchronous data transfers to address these differing needs. However, in some applications it becomes necessary to provide improved reliability and accuracy while also guaranteeing bandwidth and packet delivery times. Prior art approaches do not provide the ability to both guarantee delivery- bandwidth and the ability to resend a packet detected to contain errors at a receiving node. Such a need exists, for example, in systems where a transmitted data stream is broadcast to both a digital video display device and a data recorder. This situation may occur when a customer receives a digitally encoded video transmission such as a movie, and also wishes to archive a copy of the received video transmission for later use. Another use may involve a music studio where multiple real time sources provide inputs for the creation of a master recording.

It would be desirable to have a system with a data transfer mechanism which could provide improved reliability and accuracy while at the same time guaranteeing a specified channel bandwidth and a packet delivery latency. It would be desirable to provide a protocol whereby errant data packets could be detected and retransmitted while still maintaining a guaranteed bandwidth and latency. Methods are needed to allow an isochronous data packet to be broadcast to a plurality of nodes and to also allow the data to be resent within a strict time limit if one or more nodes detect the associated received packet to be errant. It would be desirable to have a protocol whereby an errant data packets could be resent a limited number of times so as limit the amount of bandwidth which can be consumed in attempting to send any given packet under the worst case channel-error conditions.

SUMMARY OF THE INVENTION

The present invention involves a method of transmitting an isochronous packet stream with improved reliability. The method involves transmitting a first data packet within an isochronous packet stream, receiving a second data packet indicative of a request to resend the first data packet, and in response to the second data packet, resending said first data packet.

Other aspects of the present invention involve apparatus to implement aforementioned methods.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

The various novel features of the present invention are illustrated in the Figures listed below and described in the detailed description which follows.

FIG. 1 is a high level block diagram representing of a data transfer system involving an isochronous data channel having improved accuracy in accordance with a preferred embodiment of the present invention;

FIG. 2 is a detailed block diagram representing an embodiment of a data transfer system involving an isochronous data channel having improved accuracy in accordance with the present invention;

FIG. 3 is a flowchart illustrating a method of processing carried in hardware or software and used to implement an isochronous data channel having an improved accuracy in accordance with a preferred embodiment of the present invention;

FIG. 4 is a flowchart illustrating a method of processing carried out in hardware or software used to employ a high priority buffer to queue isochronous resend requests used to improve accuracy of data received in isochronous data transfers in accordance with a preferred embodiment and of the present invention;

FIG. 5 is a flowchart illustrating a method of processing carried out in hardware and/or software for transmitting an isochronous packet stream with improved reliability in accordance with a preferred embodiment of the present invention.

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

FIG. 1 is a high-level block diagram of a system 50, which includes a resend mechanism used to improve the accuracy of isochronous data transfers. A host bus interface 15 is coupled to a host bus 10. For example, the host bus 10 may be any standardized system bus such as a PCI bus, an ISA bus, a PCMCIA bus, or a VME bus, so that the host bus interface 15 would then correspond to a PCI bus interface, an ISA bus interface, a PCMCIA bus interface or a VME bus interface. In other systems, host bus 10 may involve local bus protocol as defined by the data, address and control signals of a host microprocessor or microcontroller. Link layer transceiver 25 is coupled to an isochronous buffer 30 and an asynchronous buffer controller 35 and host bus interface 15. Both isochronous buffer 30 and asynchronous buffer 35 are connected to a physical layer interface unit 40. Physical layer interface unit 40 generates signals to be transmitted on a communication medium 45. For example, communication medium 45 may be implemented as the physical layer cabling or backplane of an IEEE 1394 compliant serial bus. In system 50, all data paths are shown to be bidirectional. More details of the actual data paths used within system 50 are discussed in connection with FIG. 2.

The system of FIG. 1 is operative to support both isochronous and asynchronous data transfers. Link layer transceiver 25 is operative to control asynchronous data transactions such as read, write, and locked read/write operations as well as isochronous data transactions. Host bus interface 15 is operative to set up direct memory access (DMA) channels in order to support command and data transfers from memory or peripherals accessible from host bus 10 to link layer transceiver 25. In the IEEE 1394 specification, a transaction layer defines a request-response protocol to perform bus transactions such as read, write, and locked read-modify-write cycles. In a 1394 system, transactions controlled at the transaction layer appear to the system much like memory accesses. Streams are also set up to support media devices such as cameras, video players, and music players. In presently available 1394 systems, media streams are typically sent using isochronous channels which involve non-acknowledged data transfer mechanisms.

Link layer transceiver 25 is operative to implement a link layer of a protocol stack such as the protocol stack of the IEEE 1394 specification which comprises a transaction layer and a link layer. The link layer is responsible for formatting data into packets for both asynchronous and isochronous data transfers. Asynchronous transfers are always acknowledged and may be resent as many times as specified by software if a receiver connected to the communication medium 45, the receiver sends a busy acknowledge back to the transmitter.

Isochronous buffers 30 and 31 are employed to manage incoming and outgoing information. Isochronous outgoing information is transmitted across communication medium 45 using the isochronous buffer 30, while a asynchronous data packets is transmitted across communication medium 45 using the asynchronous buffer 35. Isochronous incoming packets are stored in isochronous buffer 31, while asynchronous incoming packets are stored in asynchronous receive buffer 32. The presentation and extraction of the data packets onto communication medium 45 is controlled by physical layer interface unit 40.

System 50 is also operative to implement an acknowledged isochronous data transfer mechanism in accordance with the present invention. Link layer transceiver 25 controls the packetization and transmission of an isochronous packet stream using the isochronous buffer 30. In accordance with a preferred embodiment of the present invention, link layer transceiver 25 also is operative to receive an isochronous-retry packet. Depending on the system, an isochronous-retry packet may be received via one of isochronous channels 31 or via asynchronous protocol 36. When the isochronous-retry packet is received, the link layer transceiver is operative to resend an error-free version of the errant isochronous packet one of a variety of ways. The isochronous data packet may be resent using the same isochronous channel used to send the original isochronous packet, a reserved resend-isochronous channel, or via the asynchronous protocol. Also, resend operations may be handled by a higher layer of software control. A more detailed description of these and other aspects of the present invention are described in connection with FIGS. 1–3 which follow.

While the system 50 illustrates a bus bridge from host bus 10 to serial bus 45, it may be used generally to implement the data transfer mechanisms of the present invention in a variety of systems. For example, bus 10 may represent a transmitting node in a network configuration such as ethernet. In this case, bus interface 15 may be implemented by any transport and/or network layer software components such as ones which comply with the standardized transport control protocol (TCP), the user datagram protocol (UDP) and the internet protocol (IP). The isochronous channels then represent QOS guaranteed paths as provided by RSVP routers. The asynchronous protocol then represents an acknowledged protocol such as a TCP virtual connection. Hence, it is to be understood while the present disclosure focuses on an embodiment involving an IEEE 1394 system, the present invention teaches a concept which may more generally be applied to various forms of communication systems and network protocols.

Referring now to FIG. 2, a block diagram of system 100 involving a specific embodiment of the link layer transceiver 25 is illustrated. In the system 100, a host bus interface unit 125 connects to a host bus 110. As in system 50, host bus 110 and host bus interface 125 may comply with any variety of standardized bus protocols such as the PCI bus, the ISA bus, the PCMCIA bus, or the VME bus, for example. Additionally, the host bus may be implemented as a native processor bus whose data address and control signals are defined in terms the pins supplied by a host microprocessor or microcontroller. In the illustrative embodiment shown, host bus 110 is the PCI bus and host interface 125 includes a direct memory access controller (DMAC). In some embodiments, the DMAC may in fact be implemented on a separate chip as used to implement host bus interface 125. In other embodiments, the DMAC may be implemented on the same chip as host interface 125. In most systems, it is preferable to control a set of data transfers from a set of data sources 115 under control of the DMAC. In most systems, it is also preferable to control a set of data transfers to a set of data destinations 120 under control of the DMAC. Set of data sources 115 and set of data destinations 120 are coupled to host bus 110. Set of data sources 115 and set of data destinations 120 typically include one or more banks of memory and one or more peripheral devices such as hard disk drives, CD-ROM devices and the like.

Host bus interface 125 is coupled to asynchronous buffer 35 or isochronous buffer 30 via a first demultiplexer 130. First demultiplexer 130 has one input, which is coupled to host bus interface 125 and two outputs. The first output of is coupled to isochronous buffer 30 and the second output to asynchronous buffer 35 to provide transmit data to respective buffers.

The output of general receive buffer 175 is coupled to first input of a second multiplexer 185. The output of ISOC retry packet buffer 170 is fed to the a second input of multiplexer 185. The output of multiplexer 185 is connected to provide input to host bus interface unit 125. As indicated by the dotted lines, much of system 100 implements a particular embodiment of link layer transceiver 25. In different embodiments, multiplexer 185 may be eliminated and rep laced with a hard-wired data path.

System 100 is operative to implement both isochronous and asynchronous data transfer mechanisms to transfer data from a data source 115 to a node 160 connected to physical layer 150 by physical layer medium 155, which is in this example 1394 bus. The system 100 is also operative to use these same data transfer mechanisms to transfer data from one of nodes 160 to data destination 120. System 100 implements a set of standard buffering and data transfer techniques as are known in IEEE 1394 based systems.

Unlike presently available systems, link layer transceiver 25 is also operative to process isochronous-retry packets. An isochronous-retry packet is a packet sent from one or more nodes 160, which have missed the packet due to insufficient buffer space or have detected a received isochronous packet to be errant. A missing packet can be detected by an incorrect sequence number, an incorrect time stamp, or other mechanism. In the depicted example, the isochronous-retry packet is transmitted from node 160 onto physical medium 155 and extracted therefrom by physical layer interface unit 150. Physical layer interface unit 150 forwards the isochronous-retry packet to link layer receiver 165. Link layer receiver 165 identifies the packet as an isochronous-retry packet and preferably routes it to isochronous-retry packet buffer 170. In order to meet real time requirements of isochronous data transfers,.isochronous-retry packet buffer 170 is assigned a high priority so as to be serviced before packets delivered to the general receive buffer.

Two possible implementations exist where the isochronous-retry packet is routed via second multiplexer 185 to host interface unit 125 Either higher level software is responsible for resending the needed isochronous packet either isochronously or asynchronously, or the DMA hardware will resend the isochronous packet either isochronously or asynchronously As noted above, some implementations may pass the isochronous-retry packet s directly into the general receive buffer. A method used to process isochronous retry in higher layer software is discussed in connection with FIG. 4 below.

In accordance with a preferred embodiment of the present invention, isochronous-retry request packets are processed within DMA/Host bus interface 125. A set of protocols used to process isochronous-retry request packets may be performed within DMA using hardware and/or software. As discussed in connection with FIG. 3 below, the DMA then resends the requested isochronous data packet using a selected data transfer mechanism. For example, the resend operation may be occur using the same isochronous channel on which the packet was first transmitted, a separate isochronous channel reserved isochronous resends, or asynchronousprotocol.

Referring now to FIG. 3, a process of controlling data transfers 200 is illustrated. In a first step 205, a data packet is received. This data packet is provided by the physical layer device 150:and received by link layer receiver 165. In terms of FIG. 1, step 205 involves receiving a packet via either one of isochronous channels 30 or via asynchronous protocol 35 into buffered link layer transceiver 25. After the packet is received, a series of binary decisions are made. In a given implementation, some decisions may be hardwired to be always true or always false. In this sense, the decision tree outlines multiple possible embodiments as well as a full-featured embodiment which implements all of the decision branches. Also, while the illustrative sequential logic involves a binary-decision tree structure, equivalent decision structures involving composite decisions with multiple output branches or interrupt driven decision logic may also be used. The logic of the process illustrated in FIG. 3 may be implemented in hardware, software, or a combination of both. For example, the decision for the resend packet to be transmitted isochronously can be hardwired or be enabled by software through a control register.

Control passes from step 205 based on a first decision in step 210. In step 210, a check is made to determine whether the packet received in the step 205 is an isochronous-retry request packet. If the decision in step 210 evaluates affirmatively, control next passes based on a second decision 215. In the step 215, a check is made to determine whether to resend the requested packet via an isochronous channel or asynchronous protocol. If the second decision in step 215 is evaluates affirmatively, indicating the resend operation is to occur using an isochronous channel, the flow of control is next governed by a third decision in step 220. The third decision in step 220 checks whether the resend operation is to occur on the same isochronous channel used to transmit the errant packet, or whether to use a separate isochronous channel dedicated to resend operations. If the third decision in step 220 evaluates affirmatively, control passes to step 225.

In step 225, an isochronous-resend operation is performed using the same channel used to transmit the errant packet. This is enabled using an aspect of the present invention involving over allocated isochronous channels. For example, in the 1394 specification, an isochronous channel is defined in terms of timeslots within a periodic 125 us period. This 125 us period is divided into 6144 slices called "bandwidth allocation units." Each bandwidth allocation unit corresponds to a time slice of 20 ns. Timeslots longer than 20 ns are built using multiple bandwidth allocation units. For example, an isochronous channel with a 100 ns timeslot is assigned five bandwidth allocation units. The actual number of bits transmitted within a given bandwidth allocation unit depends the data rate used on the isochronous channel to which the bandwidth allocation unit is assigned. The data rates supported in by 1394/1995 specification are 100, 200 and 400 megabits per second (MBPS). An isochronous resource manager assigns a particular number of bandwidth allocation units to provide an isochronous channel with enough bandwidth to guarantee a particular device attached to the 1394 bus can periodically deliver its packets at a given data rate.

When over allocated isochronous channels are used, a device requests more bandwidth than it needs to send its packet stream. For example, a given device requires ten bandwidth allocation units but requests the isochronous resource manager to allocate. an isochronous channel having twenty bandwidth allocation units. In this case, the isochronous channel is doubly over allocated since only half of the channel's capacity is used. In the 1394 specification, unused over allocated bandwidth is always available to asynchronous traffic, so only isochronous traffic is restricted over allocatedover allocatedover allocatedover allocatedIn step 225, an isochronously delivered packet which was requested in step 205 is resent using an over allocated isochronous channel. For example, the isochronous channel is over allocated by a factor of two. A packet stream is sent by a transmitting node to a set of one or more receiving nodes using only half of the allocated bandwidth. In an allocated timeslot within a first 125 us interval, a first packet is delivered on the isochronous channel. In response, an isochronous-retry request packet is received in step 205 indicating one or more of the receiving nodes sent back an isochronous-retry request packet. In this example, where the doubly over allocated isochronous channel is used, control thereby passes from step 205 via the decisions in steps 210, 215, and 220 to the step 225. In a second 125 us interval immediately following the first 125 us interval, the transmitting node sends a second packet corresponding to the next packet in a sequence of packets transmitted from the transmitting node to the receiving nodes. Because the isochronous channel is over allocated by a factor of two, there is enough bandwidth available within the isochronous channel to also resend the requested first packet.

When no retry packet is received, only half of the doubly over allocated channel's timeslot need be used. The unused portion of the over allocated isochronous channel is thereby made available to asynchronous traffic. When an isochronous-retry request packet is received, the full capacity of the over allocated channel is used to transmit a current packet and to retransmit a previous packet requested to be resend. In some embodiments, the requested packet may be placed in the first portion of the allocated timeslot in the over allocated isochronous channel. The second packet is thereby sent in the second timeslot. This embodiment may be used to simplify packet-reordering operations at the receiving node. In other embodiments, the current packet may always be sent in the first timeslot within the isochronous channel followed by any isochronous-resend packets. Different embodiments give rise to different implementations of data stream reassembly in the receiving nodes. However, due to prefetching, the second embodiment listed above is preferred.

Alternative implementations of the present invention may also be configured to implement the aforementioned use of over allocated channels in step 225. For example, in one embodiment, an isochronous channel is over allocated by a factor of N. A typical value for N may be N=2 whereby twice the amount of bandwidth needed for an associated isochronous packet stream is allocated. In an alternative embodiment, instead of sending a packet and listening for a retry in step 205, each packet in the isochronous packet stream is automatically transmitted multiple times. This way, the receiving nodes always receive each packet multiple times and only keep one selected copy of the received packet. The selected copy is the one which has the lowest number of errors (usually zero) as determined by error detection methods such as the CRC check bits sent in the 1394 system. This alternative embodiment has the disadvantage that the over allocated channels are kept busy all the time and thus do not free up unneeded resend bandwidth to the asynchronous data traffic. That is, if the first packet is received without error, no resend would be needed, but the alternative embodiment immediately resends the data packet N times anyway.

In the alternative embodiment, no retry packets need be sent from any receiving node when an error is detected. Hence the logic in both the transmitting node and the receiving node may be simplified. In FIG. 3, the second step 225 is simply repeated every time a packet in an isochronous packet stream is transmitted. Control need not flow into step 225 from step 205 via the decisions in steps 210, 215 and 220 as indicated, by FIG. 3. Also, the alternative approach puts less demand on a jitter buffer located in each receiving node. Since the same packet is sent multiple times within the same 125 us interval, the resent packet is immediately available, thus providing a guaranteed time of arrival equal to the situation where an isochronous packet is received without error and without the need for a resend. The jitter buffer is used when packets do not always arrive in the same instant within a periodic time-slot. When isochronous resends are performed so that a packet is resent in a subsequent timeslot, the jitter buffer is employed to accommodate packets arriving one or more intervals late, depending on the number of retries allowed in a given implementation. This increases the net latency of the system so that the effective time-of-arrival guarantee is one or more 125 us intervals later than desired. Hence, the alternative embodiment which simply sends the same packet multiple times using an over allocated isochronous channel may be advantageously used to eliminate isochronous retry request packets and associated logic and protocols. At the same time, the alternative embodiment provides an improved time-of-arrival guarantee. This improved time-of-arrival guarantee comes at the expense of extra bandwidth consumed and thereby denied to asynchronous traffic. Other embodiments within the scope of the present invention may be constructed as a combination of the previously described approaches.

Another path through the process in FIG. 3 is taken when an isochronous-resend operation is performed using a separate isochronous channel dedicated to resend operations. This corresponds to the path from step 205 via the decisions in steps 210, 215, and 220 to step 230. In this case, the decision in step 220 indicates a separate channel dedicated to isochronous resend operations is to be used. This path through method 200 has several advantages. In most embodiments the number of retry requests will be relatively small. Thus, a transmitting node sending packet streams on a plurality of isochronous channels may elect to allocate one separate channel for resend operations. If no resends are needed, the reserved channel is never used and its associated timeslot is automatically made available to asynchronous traffic. If a resend is needed on a given channel, the dedicated resend channel is thereby used. Undersubscription may also be used on the dedicated resend channel to allow a plurality of requested packets to be resent in a given timeslot. Typically, a given embodiment will only implement either the path through steps 205, 210, 215, 220, and 225 or the path 205, 210, 215, 220, and 230. Other embodiments may provide options to implement both of these paths:

Another path through the process in FIG. 3 is used when an isochronous-resend operation is performed using an asynchronous protocol. In this case an isochronous-retry request packet is received in step 205 so the decision in step 210 evaluates affirmatively and control is governed by the second decision 215 which evaluates negatively. That is, the second decision in step 215 checks to see if the resend operation is to be performed using an isochronous channel, and the negative result causes control to pass to step 235 where the resend operation is handled asynchronously. For example, in the 1394 system, no more than 80% of the total system bandwidth may be allocated to isochronous traffic. Hence 20% or more of the total bandwidth is made available for asynchronous traffic. A bus arbitration policy is implemented whereby potential transmitting nodes arbitrate for the use of the serial bus. When a node is granted control of the bus, it may send data to another node using memory mapped read, write and locked read-write transactions. When step 235 is selected, implemented no isochronous bandwidth need be allocated for resend operations.

One issue related to embodiments which asynchronously resend isochronous data packets is the loss of a guarantee of a delivery time. While this could provide difficulties for real-time receiver devices, it is less of a problem for a device such as a data recorder. A real-time device such as an MPEG-2 decoder and an associated video display system must meet real-time packet reception requirements, while the data recorder must meet data integrity requirements. For example, when an isochronous data stream is broadcast to both a media player and a recorder, the media player can tolerate errors but must receive packets at a specified rate and within a specified jitter-tolerance. Meanwhile, it is desired for the recorder to make an error-free recording. Hence the media player is able to make use of an on-time packet containing one or more errors, and the recorder is able to make use of an asynchronously resent and error free packet arriving possibly at an unspecified later time. In this case, the real-time demand of the media player is met, and the data integrity demand of the recorder is also met.

Current IEEE 1394 systems use an arbitration scheme for asynchronous bus accesses whereby the root node of the system is given a high priority and all other nodes are given equal priorities. When isochronous resend operations are supported, it is preferable to use more priority levels to allow a node resending an isochronous packet asynchronously to bypass other traffic seeking access to the bus.

In many cases, the packet received in step 205 is not an isochronous-retry request packet. In such a case, the first decision in step 210 evaluates negatively and control is governed by a fourth decision in step 240. The fourth decision in step 240 checks to see whether the received packed is an isochronous packet or an asynchronous packet. If the packet is isochronous, the fourth decision evaluates affirmatively and control passes to step 245. If the fourth decision evaluates negatively, control passes to step 250. In either of these cases, the packet received in step 205 is processed using standard techniques. For example, the packet is received from physical layer interface 150, directed to the link layer receiver 165 and passes to general receive buffer 175. In step 245, an isochronously received packet is transmitted across host bus interface 125 to an isochronous receive buffer located within data destination 120. In step 250, an asynchronously received packet is transmitted across host bus interface 125 to an asynchronous receive buffer located within data destination 120. These transmissions are preferably performed using a DMAC located within host interface unit 125.

Referring now to FIG. 4, a process of a flowchart for enabling isochronous resend operations is depicted in accordance with a preferred embodiment of the present invention by software.

In step 305 a packet is read from data destination 120 by software. Control passes from the step 305 based on a first decision in step 310 which checks to see whether the packet received in step 305 is an isochronous-retry request packet. If the first decision in step 310 evaluates affirmatively, control passes to step 315. In step 320, an isochronous retry-request processed The process in FIG. 4 is implemented within the transaction and stream controller which is implemented in a higher protocol layer. A higher protocol layer is a layer of software which executes on a first node and communicates with a peer layer of software on a second node. Information is passed from the higher layer software on the first node to a lower layer on the first node until the physical layer is reached and information passes to the second node. In the second node, the information is passed from lower to higher layers until the peer layer is reached. A link layer is generally one layer above the physical layer and handles issues such as data formatting and framing for transport across a communication link. Depending on the protocol an higher layer may be a network layer, a transport layer, an ATM adaptation layer, or a transaction layer, for example. In such a case, higher layer software preferably allows isochronous-retry data to be queued in a high priority sub-queue and processed before standard packets.

If the packet received in step 305 is a normal data packet such an isochronous data packet or an asynchronous data packet, the first decision in step 310 evaluates negatively and control is governed by a second decision in step 325. The second decision in step 325 checks to see whether the received packed is an isochronous packet or an asynchronous packet. If the packet is isochronous, the second decision in step 325 evaluates affirmatively and control passes to step 330. If the second decision 325 evaluates negatively, control passes to a fifth step 335. In either of these cases, the data packet received in step 305 does not involve an isochronous-retry request packet but rather involves standard packet processing techniques. For example, the data packet is received from physical layer interface 150, directed to link layer receiver 165 and passes to general receive buffer 175. In step 330, an isochronously received packet is transmitted across host bus interface 125 to a data destination 120. In step 335, an asynchronously received packet is transmitted across host bus interface 125 to a data destination 120. These transmissions are preferably performed using a DMAC located within host interface unit 125. Also, data destinations 120 preferably include separate buffered areas for isochronously and asynchronously received data.

Referring now to FIG. 5, a flowchart of a process for transmitting an isochronous packet stream is depicted in accordance with a preferred embodiment of the present invention. In step 404, a packet is transmitted as a part of an isochronous packet stream. This isochronous packet stream is made up of a set of packets which are sent isochronously to meet bandwidth and delivery-time or jitter-tolerance specifications. Control passes out of the 405 based on a first decision in step 415 The decision in step 415 checks to see whether an isochronous retry request is pending. If the decision in step 415 is affirmative, control passes to step 420 where the requested packet form the isochronous packet stream is resent. Step 420 effectively adds the requested packet reported to be received in error to a subset of packets which must be resent. Step 420 may involve any of the resend methods discussed in connection with FIG. 3. If the decision in step 415 is negative, the normal operation continu (no resent will be scheduled).

As discussed in connection with FIG. 3, an alternative embodiment of the process in FIG. 5 is to not detect isochronous-retry packets but to send a plurality of copies of each packet in step 405. In this case the subset of packets resent is equal to the set of packets sent in the isochronous packet stream.

Although the present invention has been described with reference to specific embodiments, other embodiments may occur to those skilled in the art without deviating from the intended scope. For example, in an example network environment, asynchronous packets correspond to TCP packets while isochronous packets correspond to RSVP packets sent as a bandwidth guaranteed stream of UDP datagrams. TCP packets require an acknowledgement to be sent from the receiver back to the transmitter, while UDP datagrams do not. In such systems, the physical layer may involve a media access layer (MAC) such as employed in Ethernet systems. The present invention directly applies if other physical layers optical channels in FIDDI networks or fiber channel systems are used. Thus, the present invention may be directly applied to any multimedia network involving an isochronous packet flow. Also, the transmission of an isochronous-retry packet may be triggered by events other than checking a CRC code for an error or not receiving the original packet. In general, the error criterion may be configured, for example, to only request a retry if more errors are detected in a received packet than are correctable or if some other error criterion is not met. Moreover, while the sequential logic carried out in the process in FIG. 3 and the process in FIG. 4 involve a tree structure involving sequential binary decisions, equivalent decision structures such as composite decisions with multiple output branches or interrupt drive decision logic may also be used. Therefore, it is to be understood that the invention herein encompasses all such embodiments which do not depart from the spirit and scope of the invention as defined in the appended claims.

What is claimed is:

1. A method comprising the step of:
    transmitted a first data packet within an isochronous packet stream; and
    receiving a second data packet indicative of a request to resend the first data packet; and
    in response to the second data packet, resending the first data packet,
    wherein information related to the second data packet is temporarily stored in a high priority queue and wherein the high priority queue is managed by a link layer protocol software layer within a buffer link layer interface transceiver.

2. The method of claim 1, wherein the isochronous packet stream is sent on a first isochronous channel.

3. A method of claim 2, comprising the step of:
    transmitted a first data packet within an isochronous packet stream; and
    receiving a second data packet indicative of a request to resend the first data packet; and
    in response to the second data packet, resending the first data packet, wherein the isochronous packet stream is sent on a first isochronous channel and wherein the first isochronous channel comprises a timeslot, the timeslot being a variably placed sub-interval within a specified period.

4. The method of claim 3, wherein the specified period is 125 microseconds.

5. The method of claim 3, wherein both the step of transmitting and the step of resending use the same isochronous channel, the step of transmitting transmits the first data packet in a first subinterval within the timeslot and the step of resending resends the requested packet in a second sub-interval within the timeslot.

6. The method of claim 3, wherein the step of resending resends the first data packet using a second isochronous channel.

7. The method of claim 3, wherein the step of resending resends the first data packet using an asynchronous data transfer.

8. The method of claim 3, wherein the first data packet is transmitted onto a serial communication protocol.

9. The method of claim 3, wherein the first data packet is transmitted onto an Internet Protocol compliant data network.

10. The method of claim 9, wherein the Internet Protocol comprises a resource reservation protocol.

11. The method of claim 1, wherein the request to resend the first data packet is managed by a protocol layer above the link layer protocol software layer.

12. Apparatus comprising:
    a transmit data buffer; and
    a link layer transmitter with an input coupled to the transmit data buffer, an output coupled to provide data to a communication medium, and an output controllably coupled to the transmit data buffer, the link layer transmitter operative to direct to the communication medium a data packet containing data extracted from the transmit data buffer as a part of an isochronous packet stream; wherein the link layer transmitter initiates a resend of the data packet to improve the reliability of the data packet when the data packet is received from the communication medium.

13. The apparatus according to claim 12, further comprising a link layer receiver with an input operatively coupled to the communication medium, the link layer receiver operative to receive an isochronous-retry request packet and pass the isochronous-retry request packet along to a direct memory access unit to service the resend of the data packet.

14. The apparatus according to claim 13 wherein information related to the isochronous-retry request packet is temporarily stored in a high priority queue.

15. The apparatus according to claim 14, wherein the high priority queue is maintained by a software module operating at a higher protocol layer than a protocol layer occupied by the link layer transmitter.

16. The apparatus according to claim 12, wherein the data packet is resent using a second isochronous channel.

17. The apparatus according to claim 12, wherein the data packet is resent using an asynchronous data transfer.

18. The apparatus according to claim 12, wherein the communication medium is a serial communication protocol.

19. The apparatus according to claim 12, wherein the communication medium is a physical layer interface operatively coupled to an Internet Protocol compliant data network.

20. The apparatus according to claim 19, wherein the Internet Protocol comprises a resource reservation protocol.

21. A method comprising the steps of:
    transmitting an isochronous packet stream comprising a set of data packets; and
    transmitting a second packet stream comprising a non-empty subset of the set of data packets, wherein the second packet stream supplies redundant information used to allow a receiver the isochronous packet stream to correct otherwise uncorrectable errors in the isochronous packet stream, wherein the isochronous packet stream is sent on a first isochronous channel and wherein the first isochronous channel comprises a timeslot, the timeslot being a variably placed sub-interval within a specified period.

22. The method of claim 21, further comprising the step of:

receiving an isochronous-retry request packet and;

based on information contained in the isochronous-retry request packet, directing a packet in the set of data packets to be added to the subset.

23. Apparatus comprising:

means for transmitted a first data packet within an isochronous packet stream; and means for receiving a second data packet indicative of a request to resend the first data packet and within an isochronous packet stream; and means for resending the first data packet, wherein the isochronous packet stream is sent on a first isochronous channel and wherein the first isochronous channel comprises a timeslot, the timeslot being a variably placed sub-interval within a specified period.

24. Apparatus comprising:

means for transmitted an isochronous packet stream comprising a set of data packets; and means for transmitting a second packet stream comprising a non-empty subset of the set of data packets, wherein the second packet stream supplies redundant information used to allow a receiver receiving the isochronous packet stream to correct otherwise uncorrectable errors in the isochronous packet stream, wherein the isochronous packet stream is sent on a first isochronous channel and wherein the first isochronous channel comprises a timeslot, the timeslot being a variably placed sub-interval within a specified period.

* * * * *